106-97 AU 118 EX
6/16/87 XR 4,673,543

United States Patent [19]

Akasaka et al.

[11] Patent Number: 4,673,543
[45] Date of Patent: Jun. 16, 1987

[54] METHOD OF PRODUCING HARDENED INORGANIC PRODUCTS

[75] Inventors: Tamotsu Akasaka; Shinichi Tomiuchi; Kazuo Seto; Kenichi Matsui; Yasushi Sawada, all of Kadoma, Japan

[73] Assignee: Matsushita Electric Works, Ltd., Osaka, Japan

[21] Appl. No.: 827,223

[22] Filed: Feb. 5, 1986

Related U.S. Application Data

[63] Continuation of Ser. No. 497,904, May 25, 1983, abandoned.

[51] Int. Cl.[4] .......... B28B 5/02

[52] U.S. Cl. .......... 264/82; 106/97; 264/42; 264/86; 264/109; 264/125; 264/211.11; 264/333

[58] Field of Search .......... 264/82, 86, 42, 87, 264/109, 125, 333, 211.11; 106/97

[56] References Cited

U.S. PATENT DOCUMENTS

| | | | |
|---|---|---|---|
| 3,202,522 | 8/1965 | Yang et al. | 264/333 |
| 3,872,204 | 3/1975 | Yano et al. | 264/333 |
| 4,045,533 | 8/1977 | Mikhailov et al. | 264/333 |
| 4,148,781 | 4/1979 | Narukawa et al. | 264/42 |
| 4,310,358 | 1/1982 | Azuma et al. | 106/97 |
| 4,389,359 | 6/1983 | Brunt | 264/86 |
| 4,407,769 | 10/1983 | Harada | 264/82 |
| 4,427,610 | 1/1984 | Murray | 264/82 |

FOREIGN PATENT DOCUMENTS

| | | | |
|---|---|---|---|
| 51-57693 | 5/1976 | Japan . | |
| 53-121021 | 10/1978 | Japan | 264/333 |
| 53-121020 | 10/1978 | Japan | 264/333 |
| 57-96808 | 6/1982 | Japan | 264/42 |
| 58-20763 | 2/1983 | Japan | 264/42 |

*Primary Examiner*—Jeffery Thurlow
*Attorney, Agent, or Firm*—Koda and Androlia

[57] ABSTRACT

A method of producing hardened inorganic products is characterized in that a hydraulic material comprising slag as an effective component is mixed with gypsum and water, and mixture is then shaped and aged at an internal temperature of 50° to 100° C. to produce TSH therein and to cause hydration and hardening. The resulting hardened inorganic product features a light weight and improved fire resistance, freezing resistance, dimensional stability and strength.

10 Claims, No Drawings

METHOD OF PRODUCING HARDENED INORGANIC PRODUCTS

This is a continuation of application Ser. No. 497,904, filed May 25, 1983, now abandoned.

BACKGROUND OF THE INVENTION

1. Field of the Invention

This invention relates to a method of producing hardened inorganic products, and more particularly to a method of producing hardened inorganic products from hydraulic materials.

2. Prior Art

Slag is known to harden as it undergoes hydration in the presence of an alkaline stimulant (such as calcium hydroxide, sodium hydroxide, potassium hydroxide, etc.). A variety of applications thereof have been contemplated and practiced. By way of illustration, blast furnace cement has been produced by blending Portland cement as an alkaline stimulant with slags. There have been practiced methods of producing hardened inorganic products from hydraulic materials comprising slag as an effective component (hereinafter represented by slag). However, although slag undergoes a hydration reaction to yield an inorganic hardened product, the rate of hardening of slag is so low that the product has only a low initial strength, high density and low impact resistance.

For the purpose of achieving a necessary initial strength or a reduction of weight, there is also known a method of producing a TSH-containing hardened product comprising the the steps of admixing gypsum with a slag system so as to generate ettringite (hereinafter referred to as TSH) on hydration and hardening.

However, in these methods, the hydration reaction is unstable and causes various troubles. Thus, a slag-gypsum system does not exclusively yield TSH but gives a mixture of TSH and calcium aluminate monosulfate hydrate (hereinafter referred to as MSH) which is lean in gypsum component, and while TSH is produced nearly exclusively in a comparatively low temperature region (near atmospheric temperature) and, therefore, the system is advantageous in the sense of producing TSH in the system, the hardened product produced under such conditions was inadequate in terms of physical properties, and it has been impossible to obtain practically useful plates. For example, if aging is performed at a temperature below 50° C., TSH is produced but the plate produce has a poor resistance to freezing, and its strength is about 10 percent lower. While the reasons why such properties are adversely affected remain yet to be made clear, it is suspected that crystals of TSH so produced are so large as to cause multiple voids in the hardened product and that since the conversion to TSH progresses too fast as compared with the hardening of slag, the two components are not sufficiently intertwined. Moreover, it is suspected that as water finds its way into the above-mentioned voids and freezes there, it causes a breakdown of the system and, hence, the so-called freeze hazards.

On the other hand, for the purpose of improving the physical properties of the plate, if aging is performed under hot humid conditions at a temperature in excess of 50° C., there occurs a drastic decrease in yield of TSH with an inversely proportional increase in the amount of MSH. Such a matrix leads to decreases in freeze resistance and other physical properties. In such cases, the production of TSH and MSH and the residue of gypsum can be demonstrated by X-ray diffraction analysis. The X-ray diffraction pattern of the matrix shows that while the hydration reaction causes a large decrease of gypsum, there is no correspondingly large increase of TSH, suggesting the formation of intermediates. One of such intermediates is MSH.

While the above facts suggest that an actual variation of aging temperature results in marked changes in the composition and physical properties and, in fact, such phenomena have been actually observed and have presented problems in the production of hardened inorganic products. By way of illustration, in the production of a building panel or plate, it is actually impossible to avoid a non-uniform distribution of temperature in the aging process, but such a local variation (or scattering) of temperature results in a local non-uniformity of the proportions of TSH and MSH in a single plate, thus causing deterioration in the freeze resistance, strength and other properties of the plate. In some instances, the plate may crack and warp.

In the case of blast furnace cement, the balance between the above-mentioned formation of ettringite and the state of hardening is adversely affected so that workability is affected. Blast furnace cement is a mixture of slag and Portland cement, and the Portland cement undergoes hydration to give lime which, in turn, acts as an alkaline stimulant. Therefore, if aging is conducted in the neighborhood of atmospheric temperature, the physical properties of the plate are adversely affected for the reasons mentioned above. Increasing the aging temperature does not lead to the desired formation of TSH, and the physical properties of the product will not be satisfactory. And the formation of TSH continues even after the product has been shaped into the final form, thus causing an expansion of volume due to the formation of TSH crystals at later dates. As a result, the resistance of the plate to freezing and subsequent degradation is adversely affected. Moreover, in some cases, there occur such faults as the warping, cracking and dimensional change of the plate, deterioration of water resistance, etc. Thus, the product will have such drawbacks as an unsatisfactory service life of the plate in prolonged use.

This invention has been accomplished under the above-mentioned circumstances.

SUMMARY OF THE INVENTION

Accordingly, it is a primary object of the present invention to provide a method for producing a hardened inorganic product from an inorganic material comprising slag as an effective component without using asbestos as a reinforcing component.

It is another object of the present invention to provide a method for producing a hardened inorganic product which has an improved performance characteristic in terms of freezing resistance, strength, dimensional stability, fire resistance, etc.

In keeping with the principles of this invention, the objects of this invention are accomplished by a unique method for producing a hardened TSH-containing product by hydrating and hardening a slag-gypsum system with the presence of MSH. More specifically, the method comprises the steps of admixing a hydraulic material comprising slag as an effective component, gypsum, MSH and water, shaping the mixture and aging the shaped product in a humid atmosphere while keeping the temperature of the product at 50° to 100° C.

to generate TSH and hydrate and harden the product at the same time.

DETAILED DESCRIPTION OF THE INVENTION

The invention will be described more fully below.

The term "slag" as used in this invention denotes any and all hydraulic products of blast furnace operations that are generally called blast furnace granulated slags. Preferred are those slags having, for example, a basicity of 1.4 or more and a vitrifaction rate of 90% or more. These slags are available for example from Nippon Steel Chemical Co., Ltd. and Sumitomo Cement Co., Ltd. Blast furnace cements may be blast furnace cements of Class A, Class B and Class C as defined in JIS R-5211, and of these blast furnace cements, Class C cement is the most desirable. It should be noted that the term "cement" as used herein means not only the blast furnace cements but also other cements.

Gypsum is available in three classes according to the amount of water of crystallization contained therein: namely, calcium sulfate dihydrate, calcium sulfate hemihydrate, and anhydrous calcium sulfate. Any of these gypsum may be employed in the practice of this invention. There also are waste gas desulfurization gypsum, phosphoric acid gypsum, titanic acid gypsum, etc. according to a classification of processes, and any of such types of gypsum can be employed as well. After all, there are no limitations as to water of crystallization, producing process, etc.

MSH means calcium aluminate monosulfate hydrate which is a substance represented by the chemical formula $3CaO.Al_2O_3.3CaSO_412H_2O$. Of course, the amount of water of crystallization need not strictly be 12 molecules but may be less than 12 according to the degree of dehydration. MSH can be easily made available from a reaction of alumina with gypsum and can be manufactured for example by the process described in detail in Japanese Laid-Open Patent Application Sho-51-57693.

TSH means calcium aluminate trisulfate hydrate which is a substance represented by the chemical formula $3CaO. Al_2O_3.3CaSO_432H_2O$. This substance is produced in situ in the hardened product according to this invention as the result of a reaction of slag with gypsum. In this case, too, the value of 32 does not necessarily mean strictly 32 molecules of water of crystallization but may be less than that according to the degree of dehydration.

While MSH plays the role of the aforementioned alkaline stimulant, it reacts also with gypsum to produce TSH and apparently acts as a catalyst in connection with the formation of TSH due to the hydration reaction between slag and gypsum. Thus, in a system including MSH, the formation of TSH is very stable, and even if there is a variation in the temperature of aging in a humid atmosphere, the variation of hydration reaction is minimized. Therefore, the performance characteristic of the hardened product is improved as the yield of TSH is stabilized, the yield or residue amount of MSH is reduced and the residue of gypsum is decreased. This mechanism of the action of MSH is a novel finding by the present inventors and provides the basis of this invention.

The purpose of producing TSH in the hardened product matrix containing slag as an effective component is to reduce the weight of the product and to improve the strength and fire resistance of the product. In consideration of the balance between reduced weight and various properties and, also other factors, the proportion of gypsum is desirably selected so that TSH will be equal to 5 to 50 percent by weight (hereinafter the percent by weight will be referred to briefly as %) of the hardened product matrix. The more preferable amount of TSH is 5 to 30% and, for still better results, 5 to 10%. Thus, the amounts of materials (those of gypsum and MSH) are selected to yeild TSH within the system in a proportion within the hardened product matrix. In terms of the ratio of various raw materials to 100 parts by weight (hereinafter referred to briefly as part or parts) of slag, gypsum (on the basis of dihydrate; the same applies hereinafter) should be used in a proportion of 2 to 25 parts, preferably 2 to 17 parts and, for still better results, 2 to 5 parts. Stated differently, the proportions of raw materials are selected from the above ranges to ensure the above-mentioned yield of TSH taking into consideration the actual production conditions.

While MSH and gypsum are incorporated in accordance with this invention, MSH is desirably used in an amount of 0.7 to 10 in terms of the weight ratio of gypsum to MSH (the amount of MSH is on a 12 $H_2O$ crystal basis; the same applies hereinafter), preferably 0.8 to 8.0 and, for still better results, 1.0 to 4.0.

If the output of TSH in the hardened body matrix exceeds 50%, the freezing resistance of the hardened prodect is considerably reduced, and its dimensional change rate is also increased. If the output of TSH is less than 5%, the strength and fire-resistance of the product are adversely affected. However, when TSH is contained in the above-mentioned range, there are provided the desired initial strength due to TSH, the fire resistance due to the water of crystallization, the long-term strength due to slag, and the dimensional stability as a combined effect.

If the gypsum-to-MSH ratio is less than 0.7, the final hardened product will contain some unreacted MSH which affects its freezing resistance, dimensional stability and other properties adversely (as the unreacted MSH comes in contact with water at a later date, it is converted to TSH, causing an increase of volume). On the other hand, if the gypsum-to-MSH ratio exceeds 10, there will be a residue of gypsum in the final hardened product or coarse TSH crystals will be formed therein to thereby affect its water resistance and freezing resistance adversely.

Further improvements in the above-mentioned performance of the hardened product according to this invention can be accomplished by incorporating an inorganic filling component with particle diameters less than 500μ in the hardened product.

As far as the conventional systems composed of cement, calcium silicate and gypsum as effective components are concerned, sand (especially, fine silica sand), silicate powder, etc, are usually employed as filling components.

These particulate materials invariably have comparatively large diameters (in excess of about 500μ) and, in fact, a greater strength can be achieved for a product exclusively based on cement matrix when the grain size of the filler component is large. However, when a filling material with diameters of over 500μ is employed, the product has a poor workability even though its strength is satisfactory. Moreover, such a product is so brittle that it will be chipped in the course of transport during production, thus leading to breakage and other problems. Especially, when a plate is produced by a sheet-forming method, there was sometimes encountered the trouble of-interlayer segregation.

Inorganic fillers such as fly ash, microfine silica powder, calcium carbonate powder, etc. having diameters less than 500μ have also been used as filling components but with such materials less than 500μ in diameter, no serviceable strength can be obtained nor can adequate dimensional stability, fire resistance or freezing resistance be realized, as compared with the conventional single-component matrix. For example, if comparatively fine grains of less than 500μ in diameter are incorporated in a gel material suchas cement alone, the surfaces of the particles will not be fully covered with the gel material. Moreover, in the case of a highly crystalline matrix system such as ettringite, calcium silicate, gypsum, etc., the spaces among the crystals are large; therefore, when the fine particles are employed, it appears that the spaces are just filled with such particles and the desired improvements in performance will not be attained.

According to this invention, on the other hand, in said matrix containing slag and ettringite as effective components, the large intercrystalline spaces of the ettringite are filled with slag gel, and if the above-mentioned inorganic filler is added to such a system, there is obtained a good bond between the matrix and the filler, with the result that the dimensional stability is significantly increased, and in some instances other physical properties are also improved. For example, the strength is improved, the incidence of cracking in the fire-resistance test is decreased, and the freezing resistance is improved.

While there is practically no limitation to the above-mentioned inorganic filling component, the component should be one that does not interfere with the reactions (especially, the reaction leading to the formation of TSH) of the matrix. For example, silica powder, fly ash and silica flour which are also in the silica series, and microfine calcium carbonate powder are employed.

The proportion of inorganic filling component to be added is 5 to 30 parts, preferably 5 to 20 parts and, for still better results, 8 to 12 parts to each 100 parts of the matrix composition.

It is advantageous for practical purposes to incorporate a reinforcing component in the matrix, and, in fact, such a practice is necessary when the product is used as a building panel, for instance.

The reinforcing component may be alkali-resistant glass fiber, pulp or/and synthetic fiber. These materials can be purchased commercially and used. Alkali-resistant glass fiber can be obtained for example from Pilkington Company, England or Japan Electric Glass Co., Ltd., Japan. While it may be used in any form, the glass fiber used should have a diameter of 10 to 20μ, a length of 5 to 30 mm and a Young's modulus of no less than 8000 kg/mm. Its specific gravity is about 2.7. The synthetic fiber may for example be vinylon (a trademark of Kuraray, Ltd.), nylon, polyehtylene, polypropylene, polyacrylate or the like. Of these synthetic fibers, vinylon is the most suitable. To 100 parts of the above-mentioned matrix are added 0.5 to 2 parts of alkali-resistant glass fiber or/and synthetic fiber, 4 to 8 parts of pulp, and 2 to 15 parts of rockwool as reinforcing components. The entire mixture is made into a slurry with the aid of water, then the matrix is shaped and hardened. It should be understood that in accordance with this invention the use of above reinforcing component results in sufficient strength even if glass fiber is not used. Moreover, irrespective of whether the glass fiber is used or not, it is possible to obtain a hardened product which is light-weight and has sufficient strength without using asphalt. These facts will be further explained below.

Thus, the conventional matrix alone is virtually useless as a building material, and it is natural that a reinforcing component be incorporated for such applications. However, the use of a reinforcing component in a slag-TSH system in this invention has a special meaning as compared with the ordinary exclusive cement matrix, ettringite matrix, calcium silicate matrix, gypsum matrix, etc.

Thus, the exclusive cement matrix is so highly alkaline that the serviceable life of reinforcing fiber is always threatened (especially in the case of glass fiber and pulp). Cement crystals, which are gels, have a good "affinity" for, or "interlaceability" with fibers which are small in diameter such as asphalt, pulp, and other natural fibers but have a poor affinity or interlaceability with synthetic fibers (nylon, vinylon (trademark), acrylate, polypropylene, etc.) glass fiber, etc.

On the other hand, asbestos fiber which is generally employed as a cement-reinforcing material suffers from a shortage of supply and the restrictions of law, and substitutes for this material are being looked for. In the case of the exclusive ettringite matrix, coarse needles of ettringite are enterwinted to form a matrix so that the texture is comparatively porous. Therefore, even if a reinforcing component is incorporated, it engages the ettringite cyrstals but cannot fill the porous parts, thus failing to produce a sufficient reinforcing effect. The same applies to the exclusive calcium silicate system and the exclusive gypsum system.

In the slag-TSH system of this invention, however, the spaces between large crystals of ettringite are filled by the slag or blast furnace cement, and when above reinforcing component is added to this system, there is obtained an intimate contact between the fiber and matrix, thus displaying a very great reinforcing effect. Moreover, even in the absence of asbestos which is commonly used in cement or calcium silicate systems, it is possible to obtain reduced weight and sufficient strength with use of alkali-resistant glass fiber, rockwool, synthetic fiber, etc.

Now, the shaping method and the production of hardened product will be explained. In the first place, the above composition is admixed with water to prepare a slurry. The slurry is shaped into a desired form which is then aged and hardened to be a hardened inorganic product. The above is a general stepwise process. The shaping method is optional. It may be a sheet-forming method, an extrusion method, or a casting method, for instance. However, the shaping method using elongated screen equipment is advantageous for the production of building panels and, when applied in the practice of this invention, yields a more satisfactory result.

The aging/hardening process is conducted in a hot humid atmosphere at an internal temperature of 50° to 100° C. and, for still better results, 70° to 95° C. Even though spontaneous aging causes the creation of heat due to hydration and results in an increased internal temperature, it is preferable to apply heat externally so as to ensure the above-mentioned internal temperature. The preferable humidity is 80 to 100% RH. The most preferred range is 85 to 98% RH. The humidity of 100% RH may not be desirable, for water condensates are formed to wet the product. If, in the aging process, the product absorbs an excessive amount of condensed water, this may be undesirable in the case of a porous product, because its freezing resistance may at times be adversely affected.

This invention will be further described with reference to examples:

EXAMPLE 1-4 AND COMPARATIVE EXAMPLES 1-5

To 100 parts of a main matrix composition, consisting of class C blast furnace cement, MSH and calcium sulfate dihydrate, was added reinforcing fibrous materials in the proportions indicated in Table 1.

By means of a long-screen sheet-forming machine, the above matrix composition and fibrous materials were blended, dehydrated and press-formed. (For this operation, the fibrous materials were beated in a commercial mixer.) The pressing pressure was 20 kg/cm$^2$, and the subsequent aging was performed by allowing the shaped product to stand at 80°-90° C. and, then, under hot humid conditions for 10 hours. The product was further left standing at atmospheric temperature for 3 days, after which it was dried well at a product temperature of 80° C. The resulting hardened body had a thickness of about 12 mm and a specific gravity of $1.00\pm0.03$ g/cm$^3$. Control experiments were performed with TSH-producing systems of either Class C blast furnace cement alone or MSH-calcium sulfate dihydrate using reinforcing fibrous components in the proportions indicated in Table 1. The hardened product obtained from the exclusively blast furnace cement system had a specific gravity of about 1.6 g/cm$^3$ and the hardened body from TSH alone had a specific gravity of 1.0 g/cm$^3$. Other properties of these products are shown in Table 2. It will be apparent from Table 2 that the hardened product according to the Comparative Example 1 has such a high specific gravity that it is not desirable for the purposes of this invention. Then, using the same formulation as Example 3, experiments were performed with the aging temperature varied or in the absence of MSH. The results are set forth in Table 3. The various tests were performed according to the following aspects.

(1) Freezing resistance was evaluated in terms of the degree of swelling in the thickness direction after 100 cycles in accordance with ASTM-B Method.

(2) Dimensional stability was evaluated in terms of a reduction of dimension of a plate having a moisture content of 12% in normal condition after drying at 60° C. for 24 hours.

(3) Fire resistance was tested by Fire-Resistant Structure Class 2 Test Method of JIS A 1301.

(4) The strength test was performed with a No. 4 test piece by the method described in JIS A 1408.

(5) The amount of MSH and TSH were respectively determined by X-ray diffraction analysis.

EXAMPLES 5 AND 6

The foregoing procedure was repeated by using Portland cement in lieu of blast furnace cement to obtain the results shown in Table 4. The formulations of Example 5 other than those shown in Table 4 were the same as those used in Example 2, and the formulations of Example 6 were the same as those in Example 4. The results other than those shown in Table 4 were similar to those of the corresponding examples.

EXAMPLES 7 TO 11 AND COMPARATIVE EXAMPLES 6 AND 7

Experiments were performed by using Class C blast furnace cement, MSH and calcium sulfate dihydrate as the main matrix components and a filling component in the proportions shown in Table 6 relative to 100 parts of the matrix. In all formulations, 4 parts of pulp, 1.0 part of alkali-resistant glass fiber (½ inch long), 3 parts of rockwood and 0.5 part of vinylon (trademark) were used to each 100 parts of the matrix.

Plates were produced by the same sheet-forming method as used in Examples 1 to 4. The detailed conditions of plate production were similar to those described in Example 1. Control experiments were also performed in the exclusive Class C blast furnace cement and MSH-calcium dihydrate system for the formation of TSH using the filling component and reinforcing fiber just as in the working examples.

As described hereinbefore, this invention is characterized by blending a hydraulic material comprising slag as an effective component with gypsum and water, shaping the mixture and aging the same at an internal temperature of 50° to 100° C. to produce TSH therein and cause hydration and hardening. Therefore, the resulting hardened inorganic product features a light weight and improved fire resistance, freezing resistance, dimensional stability and strength.

TABLE 1

| | Matrix components (parts) | | | Reinforcing fiber (parts per 100 parts of matrix) | | | | |
|---|---|---|---|---|---|---|---|---|
| | Blast furnace cement | MSH | Gypsum | Pulp | Rock wool | Alkali-resistant glass fiber | Synthetic fiber | Asbestos |
| Comparative Example 1 | 100 | | | 1 | | | | 17 |
| Comparative Example 2 | 100 | | | 1 | | 4 | | |
| Comparative Example 3 | | 65 | 35 | 5 | 5 | 1 | | |
| Example 1 | 88 | 6 | 6 | 5 | 5 | 1 | 0.5 | |
| Example 2 | 88 | 4 | 8 | 5 | 5 | 0.5 | 1.0 | |
| Example 3 | 80 | 7.5 | 14.5 | 4 | 7 | 1 | 1.0 | |
| Example 4 | 80 | 1.8 | 18.2 | 4 | 7 | 1 | 0.5 | |
| Comparative Example 4 | 60 | 26 | 140 | 5 | 5 | 1 | 0.5 | |
| Comparative Example 5 | 80 | 13 | 7 | 5 | 5 | 1 | 0.5 | |

TABLE 2

| | TSH % | Residual MSH % | Flexual strength kg/cm² | Freeze resistance % | Dimensional change % | Fire resistance | Specific gravity |
|---|---|---|---|---|---|---|---|
| Comparative Example 1 | 0 | | 150 | 2–10 | 0.15 | Pass | 1.61 |
| Comparative Example 2 | 0 | | 125 | 5–10 | 0.15 | Fail | 1.60 |
| Comparative Example 3 | 95–100 | ≦5 | 130 | 40–50 | 0.25 | Pass | 0.99 |
| Example 1 | 5–10 | 1–2 | 140 | 3–6 | 0.10 | Pass | 1.05 |
| Example 2 | 8–10 | ≦1 | 145 | 2–6 | 0.11 | Pass | 1.03 |
| Example 3 | 10–15 | ≦1 | 155 | 5–10 | 0.13 | Pass | 1.03 |
| Example 4 | 15–20 | 0 | 155 | 5–10 | 0.15 | Pass | 0.98 |
| Comparative Example 4 | 30–40 | 5–8 | 145 | 20–30 | 0.25 | Pass | 1.00 |
| Comparative Example 5 | 15–20 | 4–6 | 150 | 10–20 | 0.20 | Pass | 1.02 |

TABLE 3

| | Same formulation as Example 3, temperature 80–90° C. | Same as left temperature 40° C. | Same as left, without MSH, temperature 80–90° C. |
|---|---|---|---|
| Flexual strength kg/cm² | 155 | 157 | 140 |
| Freeze resistance % | 5–10 | 10–15 | 10–15 |
| Dimensional change % | 0.13 | 0.20 | 0.13 |
| Fire resistance | Grade 2 pass | Same as left | Fail |
| Specific gravity | 1.03 | 1.20 | 1.10 |
| TSH % | 10–15 | 20–30 | 5–10 |
| MSH % | ≦1 | ≦1 | 3–4 |

TABLE 4

| | Example 5 | Example 6 |
|---|---|---|
| Formulation | | |
| Portland cement, parts | 28 | 13 |
| Slag, parts | 60 | 75 |
| MSH, parts | 4.0 | 1.3 |
| Calcium, parts | 8.0 | 10.7 |
| Properties | | |
| Flexual strength kg/cm² | 145 | 145 |
| Dimensional change % | 0.11 | 0.10 |
| Fire resistance | Pass | Pass |
| Specific gravity | 1.03 | 1.05 |
| Freeze resistance % | 2–7 | 1–5 |
| % MSH in hardened product | 1.0, approx. | <1 |

TABLE 5

| | Matrix components | | | Reinforcing fiber (parts per 100 parts of matrix) | | | |
|---|---|---|---|---|---|---|---|
| | Blast furnace cement | MSH | Gypsum | Silica powder | Calcium carbonate powder | Fly ash | Silica flour |
| Comparative Example 6 | 100 | | | 15 | | | |
| Comparative Example 7 | 100 | 65 | 35 | 15 | | | |
| Example 7 | 88 | 6 | 6 | 15 | | | |
| Example 8 | 88 | 4 | 8 | | 15 | | |
| Example 9 | 80 | 7.5 | 14.5 | | | 15 | |
| Example 10 | 80 | 1.8 | 18.2 | | | | 15 |
| Example 11 | 88 | 4 | 8 | 5 | | | |

TABLE 6

| | TSH % | Residual MSH % | Flexual strength kg/cm² | Freeze resistance % | Dimensional change % | Fire resistance | Specific gravity |
|---|---|---|---|---|---|---|---|
| Comparative Example 6 | | — | 150 | 2–10 | 0.15 | Pass | 1.61 |
| Comparative Example 7 | | 0 | 130 | 40–50 | 0.23 | Pass | 1.00 |
| Example 7 | | 1–2 | 145 | 1–4 | 0.08 | Pass | 1.10 |
| Example 8 | | ≦1 | 150 | 0–4 | 0.09 | Pass | 1.08 |
| Example 9 | | ≦1 | 150 | 3–8 | 0.10 | Pass | 1.07 |
| Example 10 | | 0 | 160 | 3–8 | 0.11 | Pass | 1.05 |
| Example 11 | | ≦1 | 155 | 1–4 | 0.12 | Pass | 1.02 |

We claim:

1. A method of producing a hardened inorganic product characterized by:

admixing a hydraulic material comprising slag as an effective component, gypsum, MSH and water, the proportion of said hydraulic material comprising slag as an active component, said gypsum and said MSH being set such that the amount of TSH to be generated is 5 to 50% by weight in hardened product matrix and such that the weight ratio of said gypsum to said MSH is between 0.7 to 10;

shaping said mixture; and aging said shaped product in a humid atmosphere keeping the temperature of the product at about 50° to 100° C. to simultaneously generate TSH from said gypsum and MSH and hydrate the slag to harden the product.

2. A method according to claim 1, wherein to 100 weight parts of hardened product matrix are added 0.5 to 2 weight parts of one or mixture selected from the group consisting of alkali-resistant glass fiber and synthetic fiber, 4 to 8 weight parts of pulp, and 2 to 15 weight parts of rockwool as reinforcing components.

3. A method according to claim 2, wherein shaping is performed by a sheet-forming method.

4. A method according to claim 3, wherein said sheet-forming method is practiced with an elongated screen type sheet-forming machine.

5. A method according to claim 1, wherein to 100 weight parts of hardened product matrix are added 0.5 to 2 weight parts of one or mixture selected from the group consisting of alkali-resistant glass fiber and synthetic fiber, 4 to 8 weight parts of pulp and 2 to 15 weight parts of rockwool as reinforcing components.

6. A method according to claim 5, wherein shaping is performed by a sheet-forming method.

7. A method according to claim 6, wherein said sheet-forming method is practiced with an elongated screen type sheet-forming machine.

8. A method according to any one of claims 1 and 2 to 7, wherein said humid atmosphere has a relative humidity of 80 to 100%.

9. A method according to any one of claims 1 and 2 to 7, wherein to 100 weight parts of said matrix is added 5 to 30 weight parts of inorganic filler component having a diameter of 500 or less.

10. A method according to claim 1, wherein the weight ratio of said gypsum to said MSH is between 1.0 to 4.0.

* * * * *

UNITED STATES PATENT AND TRADEMARK OFFICE

CERTIFICATE OF CORRECTION

PATENT NO. : 4,673,543

DATED : June 16, 1987

INVENTOR(S) : Tamotsu Akasaka et al

It is certified that error appears in the above—identified patent and that said Letters Patent is hereby corrected as shown below:

On the front page add:

[30] Foreign Application Priority Data

May 27, 1982 [JP] ...... 57-91062

Signed and Sealed this

Twentieth Day of October, 1987

*Attest:*

DONALD J. QUIGG

*Attesting Officer* *Commissioner of Patents and Trademarks*